INVENTORS
CORNELIS VAN DER LELY
ARY VAN DER LELY

United States Patent Office 2,936,034
Patented May 10, 1960

2,936,034
TRACTOR HAVING DRIVEN HIND-WHEELS

Cornelis van der Lely and Ary van der Lely, Maasland, Netherlands, assignors to C. van der Lely, N.V., Maasland, Netherlands, a limited liability company of the Netherlands Application October 11, 1955, Serial No. 539,910

Claims priority, application Netherlands October 14, 1954

3 Claims. (Cl. 180—41)

The invention relates to tractor having driven hindwheels, said tractor being provided with a frame in which the engine is arranged and in which the distance of the hind wheels can be changed.

It is an object of the invention to provide an improved tractor of this kind in which the hind wheels, though their distance is variable, are driven wheels.

Further embodiments and details will be hereinafter more fully described with reference to the accompanying drawings in which some preferred embodiments of the device according to the invention have been illustrated by way of examples and in which.

Figures 1, 2:
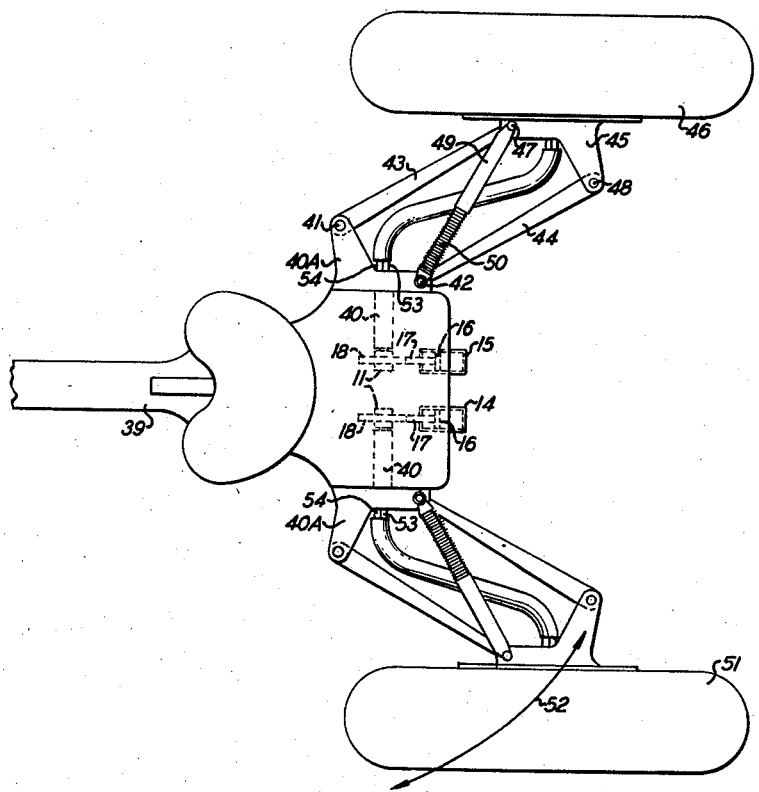
Fig. 1 is a plan elevation of the hindmost part of a tractor according to an embodiment of the invention.
Fig. 2 is a side elevation of a hind-wheel of the tractor according to Fig. 4.

In the tractor shown in Fig. 1 axle 40 is supported at both sides of the rearmost portion of the frame 39 of said tractor, by which construction members 40A are rotatable about the common center line of the axles 40. The driver can put the axles 40 carrying the members 40A into an angular position which can be controlled at will within certain limits through the intermediary of elements 16—18. Two parallel axles of rotation are supported in each member 40A. At the right side said axles are designated by 41 and 42; shafts 43 and 44 which are perpendicular to said axles are rotatably applied around them. Two axles 47 and 48 parallel to the axles 41 and 42 are supported in a part 45 of the tractor which carries the pin about which the hind-wheel 46 of the tractor is rotatable, the bars 43 and 44 being also rotatably connected to said axles 47 and 48 (see also Fig. 2). Measured between the axles 41 and 47 the bar 43 has the same length as the bar 44 measured between the axles 42 and 48, whilst the distance between the axles 41 and 42 is equal to the distance between the axles 47 and 48. The bars 43 and 44 thus constitute the opposite sides of a parallelogram which remain continually parallel to each other when the wheel 46 is laterally displaced with regard to the frame. While displacing the plane of the wheel 46 in such a way it remains continually parallel to the symmetrical plane of the tractor. The axles 42 and 47 are connected to a device 49 which defines the distance between said axles.

The device 49 consists of a cylinder which is rotatably fixed to the axle 47, and of a piston which is sliding in said cylinder and which is rotatably mounted to the axle 42. An elastic cover 50 surrounds the part of the piston of the device as far as this protrudes from the cylinder. By admitting oil into one of both chambers in the cylinder (for example, in the manner suggested by Steinen, et al., Pat. No. 2,519,002) the distance of the wheel 46 to the symmetrical plane of the tractor can be adjusted to a desired position, after which said position can be kept at that value. A similar construction is applied at the left hind-wheel 51, so that in the shown position of the member 40A in question this wheel can be moved according to the bent arrow 52. The driving of the wheels 46 and 51 occurs by means of pressure oil-driven engines built in the hubs. Said engines may be such as disclosed in Patent No. 2,745,506 (McCallum) and are connected to oil pipings in the frame 40 via flexible oil supply pipings 53 and flexible oil outlet pipings 54.

In order to be able to obtain a great and a small wheelbase preferably the arms of the parallelogram-shaped construction are able to point backwards as well as forwards.

What we claim is:

1. A tractor comprising a frame, a pair of wheels, parallelograms of links respectively coupled to each of the wheels with one end of each parallelogram fixed to the associated wheel, rotatable supports coupling each parallelogram of links to said frame, the opposite end of each parallelogram being fixed to the associated support, drive means operatively associated with said rotatable supports to rotate the same and thereby control the relative positions of the parallelograms on the frame to change the elevation of the frame with regard to said wheels, and control means operatively associated with the parallelograms for controlling the angular relationship of the links and thereby the spacing of the wheels from the frame and from each other.

2. A tractor as claimed in claim 1 wherein said control means includes an expansion and contraction device coupled between diametrically opposed corners of each parallelogram.

3. A tractor as claimed in claim 1 comprising hydraulic means fixed to said wheels for the driving of the same.

References Cited in the file of this patent
UNITED STATES PATENTS

| | | |
|---|---|---|
| 1,302,489 | Hollis | Apr. 29, 1919 |
| 1,374,784 | Trimmer | Apr. 12, 1921 |
| 1,601,512 | Silaj | Sept. 28, 1926 |
| 2,166,368 | Perron | July 18, 1939 |
| 2,231,710 | Ford | Feb. 11, 1941 |
| 2,474,471 | Dolan | June 28, 1949 |
| 2,497,072 | Cooper | Feb. 14, 1950 |
| 2,519,002 | Stemen et al. | Aug. 15, 1950 |
| 2,559,758 | Jouette | July 10, 1951 |
| 2,678,106 | Vonderheide | May 11, 1954 |